United States Patent
Lambert

(10) Patent No.: US 9,456,328 B2
(45) Date of Patent: Sep. 27, 2016

(54) METHOD AND APPARATUS FOR DYNAMICALLY ADJUSTING A CONFIGURABLE PARAMETER OF A DISCOVERY PROTOCOL DURING DISCOVERY OF DEVICES IN A WIRELESS NETWORK

(75) Inventor: Paul A. Lambert, Mountain View, CA (US)

(73) Assignee: Marvell World Trade Ltd., St. Michael (BB)

( * ) Notice: Subject to any disclaimer, the term of this patent is extended or adjusted under 35 U.S.C. 154(b) by 554 days.

(21) Appl. No.: 13/492,137

(22) Filed: Jun. 8, 2012

(65) Prior Publication Data

US 2012/0315853 A1 Dec. 13, 2012

Related U.S. Application Data

(60) Provisional application No. 61/494,613, filed on Jun. 8, 2011.

(51) Int. Cl.
*H04B 7/00* (2006.01)
*H04W 8/00* (2009.01)
(Continued)

(52) U.S. Cl.
CPC ............. *H04W 8/005* (2013.01); *H04W 28/06* (2013.01); *H04W 28/18* (2013.01)

(58) Field of Classification Search
CPC ... H04W 28/06; H04W 28/18; H04W 8/005; H04W 84/18; H04W 84/20; H04W 76/02; H04W 76/021
USPC ....................................................... 455/41.2
See application file for complete search history.

(56) References Cited

U.S. PATENT DOCUMENTS

2009/0327395 A1* 12/2009 Park et al. ..................... 709/202
2011/0170686 A1* 7/2011 Goto ............................... 380/44
2011/0228699 A1* 9/2011 Shin et al. ...................... 370/254

FOREIGN PATENT DOCUMENTS

| JP | 2003218788 A | 7/2003 |
|---|---|---|
| WO | WO2009/158656 | 12/2009 |
| WO | WO2010/035157 | 4/2010 |

OTHER PUBLICATIONS

Notification of Transmittal of the International Search Report and the Written Opinion of the International Searching Authority, or the Declaration dated Oct. 5, 2012 in reference to PCT/US2012/041605 (11 pgs).

(Continued)

*Primary Examiner* — Ankur Jain
*Assistant Examiner* — Xin Jia

(57) ABSTRACT

A method and apparatus for performing a discovery of one or more wireless devices. The method includes initiating, at a first wireless device, a discovery protocol having a configurable parameter, the discovery protocol being associated with discovery of one or more second wireless devices; determining a number of second wireless devices within a predetermined range of the first wireless device; and adjusting the configurable parameter of the discovery protocol based on the number of second wireless devices determined to be within the predetermined range of the first wireless device. The method further includes at the first wireless device, completing the discovery of one or more second wireless devices in accordance with the configurable parameter of the discovery protocol as adjusted based on the number of second wireless devices determined to be within the predetermined range of the first wireless device.

10 Claims, 2 Drawing Sheets

FIG. 2

(51) Int. Cl.
  H04W 28/06 (2009.01)
  H04W 28/18 (2009.01)

(56) References Cited

OTHER PUBLICATIONS

ISO/IEC 8802-11, IEEE Std 802.1, Information technology—Telecommunications and information exchange between systems—Local and metropolitan area networks—Specific requirements—Part 11: Wireless LAN Medium Access Control (MAC) and Physical Layer (PHY) specifications, First Edition, the Institute of Electrical and Electronics Engineers, Inc., Aug. 20, 1999, 531 pages.

IEEE Std 802.15.1™-2002; IEEE Standard for Information technology—Telecommunications and information exchange between systems—Local and metropolitan area networks—Specific requirements; Part 15.1: Wireless Medium Access Control (MAC) and Physical Layer (PHY) Specifications for Wireless Personal Area Networks (WPANs); IEEE Computer Society; Sponsored by the LAN/MAN Standards Committee; Jun. 14, 2002; 1169 pages.

IEEE 802.16; IEEE Standard for Local and Metropolitan area networks; Part 16: Air Interface for Broadband Wireless Access Systems; IEEE Computer Society and IEEE Microwave Theory and Techniques Society; May 29, 2009; 2082 Pages.

IEEE P802.11-REVmc/D3.0; IEEE Standard for Information technology—Telecommunications and information exchange between systems; Local and metropolitan area networks—Specific requirements—Part 11: Wireless LAN Medium Access Control (MAC) and Physical Layer (PHY) Specifications; Jun. 2014; 3701 pages.

"Specification of the Bluetooth System" Master Table of Contents & Compliance Requirements—Covered Core Package version: 4.0; Jun. 30, 2010; 2302 Pages.

Organized Translation of Decision of Rejection dated Feb. 15, 2016 corresponding to Japanese Patent Application No. 2014-514891, 5 pages.

\* cited by examiner

METHOD AND APPARATUS FOR DYNAMICALLY ADJUSTING A CONFIGURABLE PARAMETER OF A DISCOVERY PROTOCOL DURING DISCOVERY OF DEVICES IN A WIRELESS NETWORK

CROSS REFERENCE TO RELATED APPLICATIONS

This disclosure claims priority to U.S. Provisional Patent Application No. 61/494,613, filed on Jun. 8, 2011, which is incorporated herein by reference.

TECHNICAL FIELD

The present disclosure relates generally to wireless networks, and more particularly to techniques for performing discovery of wireless devices.

BACKGROUND

The background description provided herein is for the purpose of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure.

A wireless network generally refers to a network of devices that are linked together through a wireless medium, and communicate over the wireless medium via a wireless distribution method—e.g., spread-spectrum or orthogonal frequency-division multiplexing (OFDM). A wireless network typically operates in accordance with processes specified in one or more standards of wireless communication (also referred to herein as "wireless communication standards"). Different methods and standards of wireless communication can generally be classified into the four following categories, identified in the headings below, based on a specific application and/or transmission range.

Personal Area Network (PAN)

A Personal Area Network (PAN) is a computer network used for short range communication among devices (including telephones and personal digital assistants). The reach of a PAN is typically a few meters. PAN's can be used for communication among a particular group of devices themselves (intrapersonal communication), or for connecting to a higher level network and/or the Internet. Personal area networks may be wired with computer buses such as USB and FireWire. However, a wireless Personal Area Network (WPAN) is typically made possible with wireless communication standards such as Infrared and Bluetooth™.

In particular, the Infrared Data Association (IrDA) defines physical specifications communications protocol standards for the short range exchange of data over infrared light, for typical use in Personal Area Networks. Bluetooth is an industrial specification for wireless personal area networks (PANs), also known as IEEE 802.15.1. Bluetooth provides a way to connect and exchange information between devices such as personal digital assistants (PDAs), mobile phones, laptops, PCs, printers, digital cameras and video game consoles via a secure, globally unlicensed short-range radio frequency.

Local Area Network (LAN)

A wireless Local Area Network (wireless LAN or WLAN) generally corresponds to the linking of two or more devices without using wires. A WLAN utilizes spread-spectrum or OFDM technology based on radio waves to enable communication between devices in a limited area, also known as the basic service set (BSS). The IEEE 802.11 standard, also commonly referred to as the Wi-Fi standard, denotes a set of Wireless LAN/WLAN standards developed by working group 11 of the IEEE LAN/MAN Standards Committee (IEEE 802). The IEEE 802.11 standard supports two types (or modes) of wireless LAN networks—i) infrastructure mode or ESS networks, and ii) ad-hoc mode or IBSS (independent BSS) network.

Metropolitan Area Network (MAN)

Wireless Metropolitan Area Network (MAN) is the name trademarked by the IEEE 802.16 Working Group on Broadband Wireless Access Standards for its wireless metropolitan area network standard (commercially known as WiMAX), which defines broadband Internet access from fixed or mobile devices via antennas. WiMAX is defined as Worldwide Interoperability for Microwave Access by the WiMAX Forum, formed in June 2001 to promote conformance and interoperability of the IEEE 802.16 standard, officially known as WirelessMAN. In accordance with the WiMAX standard, subscriber stations can communicate with basestations that are connected to a core network.

Wide Area Network (WAN)

A Wide Area Network or WAN is a computer network covering a broad geographical area—in contrast to personal area networks (PANs), local area networks (LANs) or metropolitan area networks (MANs) which are typically limited to a room, building or campus. The largest and most well-known example of a WAN is the Internet. In addition, WANs also refer to Mobile Data Communications, such as GSM (Global System for Mobile Communications), GPRS (General Packet Radio Service), EDGE (Exchanged Data rates for GSM Evolution), 3G, HSDPA (High speed Downlink Packet Access), and the like.

A wireless communication standard typically specifies one or more protocols or processes that enable a wireless device to discover another wireless device. Such protocols are commonly referred to as discovery protocols. For example, in accordance with a discovery protocol associated with an infrastructure mode wireless LAN (or ESS network), an access point (AP) advertises its presence by transmitting short wireless messages (referred to as beacons) at a regular interval (e.g., approximately every 100 mSec) on one of a number of radio frequencies (or channels) that may be available for communication. The beacons include information about the capabilities of the access point and also serve as a timing reference for some of the protocol operations such as power saving modes. The capabilities advertised in a beacon include information corresponding to the network name or SSID, the supported data rates, and so on. Wireless devices can connect with an AP in an ESS network either through performing an active scanning process or a passive scanning process. An active scanning process involves a wireless device sending a probe request to the AP (and then eventually receiving a probe response); while in a passive scanning process, a wireless device listens for beacons on one of a number of radio frequencies (or channels) that may be available for communication. Once a wireless device discovers the identity of an AP, the wireless device can then proceed with authentication procedures as specified, e.g., in IEEE 801.11 standard (which is incorporated herein by reference).

In accordance with a discovery protocol associated with an IBSS network, a first device can discover one or more second devices by first initially listening for a beacon from a second device. In response to the first device not receiving any beacons, the first device typically waits for a random time (within a fixed range) prior to sending beacons. However, in response to the first device receiving a beacon from a second device, the first device can then synchronize its timing with the second device, and the two devices may share the process of sending beacons according to an algorithm as defined in the IEEE 802.11 standard.

In an area or location in which there may be a large number (e.g., 10 or more) of wireless devices and/or users of wireless devices (e.g., an entertainment venue such as a sports stadium or a concert) a substantial portion of the communication over various wireless channels can comprise discovery-related traffic—e.g., beacons, probe requests, probe responses, and the like—which can reduce an overall bandwidth of the wireless channels in terms of data communications. Such a loss in overall bandwidth can be attributed in part to conventional discovery protocols generally specifying processes (or steps) to be performed by a wireless device (to discover another wireless device) irrespective of a number of wireless devices that may be present within a given area or location.

SUMMARY

In general, in one aspect, the present specification describes a method for performing a discovery of one or more wireless devices. The method includes initiating, at a first wireless device, a discovery protocol having a configurable parameter, in which the discovery protocol is associated with discovery of one or more second wireless devices. The method further includes determining a number of second wireless devices within a predetermined range of the first wireless device, and adjusting the configurable parameter of the discovery protocol based on the number of second wireless devices determined to be within the predetermined range of the first wireless device. The method further includes, at the first wireless device, completing the discovery of one or more second wireless devices in accordance with the configurable parameter of the discovery protocol as adjusted based on the number of second wireless devices determined to be within the predetermined range of the first wireless device.

In general, in another aspect, the present specification describes a first wireless device including a network discovery service. The network discovery service is configured to initiate a discovery protocol having a configurable parameter, in which the discovery protocol is associated with discovery of one or more second wireless devices. The network discovery service is further configured to determine a number of second wireless devices within a predetermined range of the first wireless device; adjust the configurable parameter of the discovery protocol based on the number of second wireless devices determined to be within the predetermined range of the first wireless device; and complete the discovery of one or more second wireless devices in accordance with the configurable parameter of the discovery protocol as adjusted based on the number of second wireless devices determined to be within the predetermined range of the first wireless device.

Potential advantages of one or more implementations disclosed herein may include a potentially reduction in a total number or discovery-related traffic over various wireless channels—e.g., by extending a beacon period (in an ESS network), or extending a (random) backoff time at which an initial beacon is to be transmitted (in an IBSS network)—in cases in which there are a large number of wireless devices and/or users of wireless devices in a given area. Additionally, wireless devices within a given area may have a reduced power consumption due to adaptation, based on techniques described herein, of discovery protocols associated with the wireless devices.

The details of one or more implementations are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION

Figure 1:
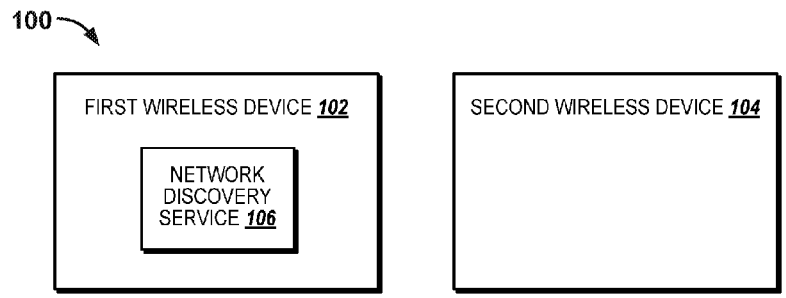
FIG. 1 illustrates a wireless network in accordance with one implementation.

FIG. 1 illustrates a wireless network 100 including a first wireless device 102 and a second wireless device 104 in accordance with one implementation. Though the wireless network 100 is shown as including two wireless devices, the wireless network 100 can include any number of wireless devices. In general, the wireless network 100 can correspond to any of the types of wireless networks discussed within the Background—e.g., a personal area network, a wireless local area network, a metropolitan area network, a wide area network, and so on. And the first wireless device 102 and the second wireless device 104 can be configured to communicate in accordance with one or more wireless communication standards discussed in connection with the Background—e.g., the IEEE 802.11 standard, Bluetooth, infrared, GPRS, WiMAX, EDGE, 3G, HSDPA, and so on.

In order to establish a wireless connection with the second wireless device 104, the first wireless device 102 includes a network discovery service 106 that performs a discovery protocol having a configurable parameter, wherein the configurable parameter is dependent (in one implementation) on a number of wireless devices within a predetermined range of the first wireless device 102. Unlike a conventional discovery protocol which generally specifies processes to be performed by a wireless device irrespective of a number of wireless devices that may be present, the discovery protocol as disclosed herein can adapt to various environments and therefore potentially reduce a total number or discovery-related traffic over various wireless channels—e.g., by extending a beacon period (in an ESS network), or extending a (random) backoff time at which an initial beacon is to be transmitted (in an IBSS network)—in cases in which there are a large number of wireless devices and/or users of wireless devices in a given area. In various implementations, the configurable parameter can correspond to one or more of a power at which a device transmits discovery-related packets (e.g., beacons, probe requests, probe responses, public action frames), an interval at which a beacon is transmitted (beacon period), a (random) backoff time at which a beacon is to be transmitted (e.g., by adjusting a backoff algorithm based on a number of wireless devices within a given area), whether or not to send a probe request, whether or not to send a probe response, and whether or not to send a beacon at all.

Figure 2:
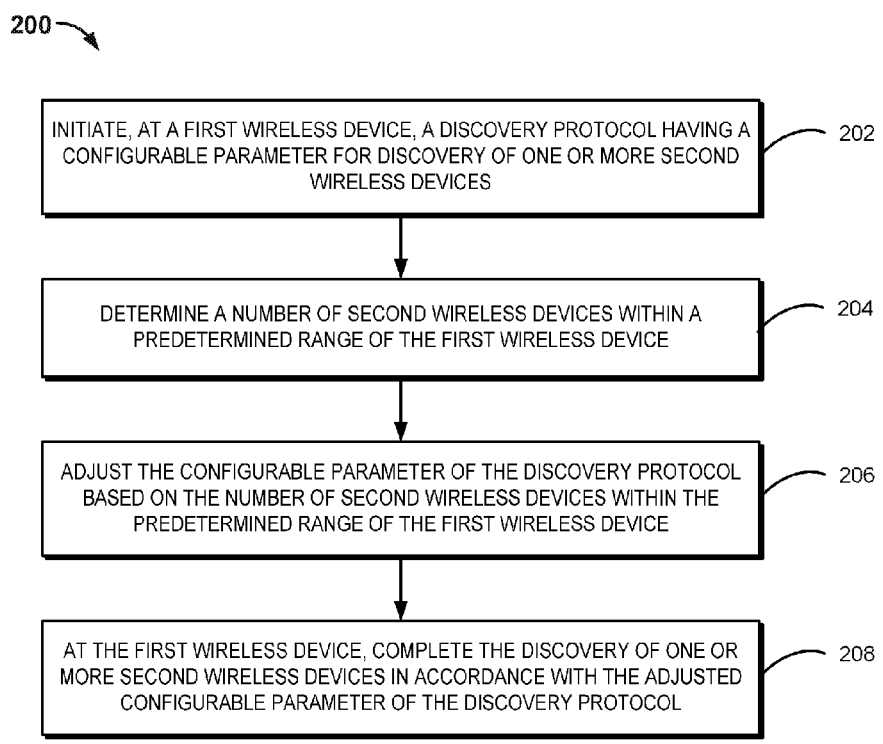
FIG. 2 illustrates a method for performing a discovery of one or more wireless devices in accordance with one implementation.

FIG. 2 illustrates a method 200 for performing a discovery of one or more wireless devices in accordance with one implementation. At a first wireless device (e.g., first wireless device 102), a discovery protocol, having a configurable parameter, for discovery of one or more second wireless devices is initiated by a network discovery service (e.g., by network discovery service 106) (step 202). The discovery protocol can be associated with one or more different wireless communication standards—including for example, the IEEE 802.11 standard, Bluetooth, infrared, GPRS, WiMAX, EDGE, 3G, HSDPA, and so on. In various implementations, the configurable parameter can correspond to one or more of i) a power at which a device transmits discovery-related packets (e.g., beacons, probe requests, probe responses, public action frames), ii) an interval at which a beacon is transmitted (beacon period), iii) a (random) backoff time at which a beacon is to be transmitted (e.g., by adjusting a backoff algorithm based on a number of wireless devices within a given area), iv) whether or not to send a probe request, v) whether or not to send a probe response, and vi) whether or not to send a beacon at all.

A number of second wireless devices within a predetermined range of the first wireless device is determined by the network discovery service (step 204). In one implementation, the number of second wireless devices within a predetermined range of the first wireless device is directly determined by network discovery service. In such an implementation, the first wireless device can directly listen to one or more wireless channels to determine how many second wireless devices may be within a predetermined range of the first wireless device. For example, in an IBSS network, the first wireless device can listen to discovery-related traffic—e.g., beacons, probe requests, and/or probe responses—and capture various unique MAC addresses corresponding to the differing second wireless devices that may be surrounding the first wireless device.

In another implementation, the network discovery service indirectly determines a number of second wireless devices that may be surrounding the first wireless device—for example, based on a location of the first wireless device and/or time of day. In such an implementation, the network discovery service can indirectly determine that there may be a large number of second wireless devices surrounding the first wireless device should a location device (e.g., a GPS system or other geolocation device associated with the first wireless device) indicate that a location of the first wireless device corresponds to a sports stadium, and the time of day corresponds to a time that a sporting event is to take place at the sports stadium.

In one implementation, the number of second wireless devices within the predetermined range of the first wireless device corresponds to only those wireless devices that communicate in accordance with one or more specific wireless communication standards (e.g., the Wi-Fi standard), and excludes wireless devices that do not communication in accordance with the one or more specific wireless communication standards (e.g., a cellular standard). In another implementation, the number of second wireless devices within the predetermined range corresponds to all wireless devices that communicate in accordance with a wireless communication standard with which the first wireless device is capable of communicating in—e.g., if the first wireless device comprises an LTE transceiver, a Bluetooth transceiver, and a Wi-Fi transceiver, then the number of second wireless devices within the predetermined range corresponds to all wireless devices surrounding the first wireless device that are capable of communicating in accordance with the LTE cellular standard, the Bluetooth standard, and the Wi-Fi standard.

The configurable parameter of the discovery protocol is adjusted (e.g., by the network discovery service) based on the number of second wireless devices within the predetermined range of the first wireless device (step 206). In various implementations, the configurable parameter can correspond to one or more of a power at which a device transmits discovery-related packets (e.g., beacons, probe requests, probe responses, public action frames), an interval at which a beacon is transmitted (beacon period), a (random) backoff time at which a beacon is to be transmitted (e.g., by adjusting a backoff algorithm based on a number of wireless devices within a given area), whether or not to send a probe request, whether or not to send a probe response, and whether or not to send a beacon at all. Alternatively, in one implementation, in lieu of or in combination with adjusting the configurable parameter of the discovery protocol based on the number of second wireless devices within the predetermined range of the first wireless device, the configurable parameter of the discovery protocol can be adjust based on a location of the first wireless device. In such an implementation, the configurable parameter can be automatically adjusted, solely or in part, on a location of the first wireless device as determined by a location device.

The discovery of one or more second wireless devices is completed at the first wireless device—e.g., by the network discovery service—in accordance with the adjusted configurable parameter of the discovery protocol (step 208). For example, in an IBSS network, in a case in which a large number of second wireless devices surrounding the first wireless device, the backoff algorithm of the first wireless device may be adjusted to delay a time at which the first wireless device sends a beacon. As another example, in an ESS (or BSS) network, a beacon period of an access point can be extended in a circumstance in which the access point is surrounded by a large number of other access points and/or other wireless devices. Additionally, the first wireless device may reduce the power at which the first wireless device transmits discovery-related packets in response to the first wireless device being surrounded by a large number of second wireless devices.

Figure 3:
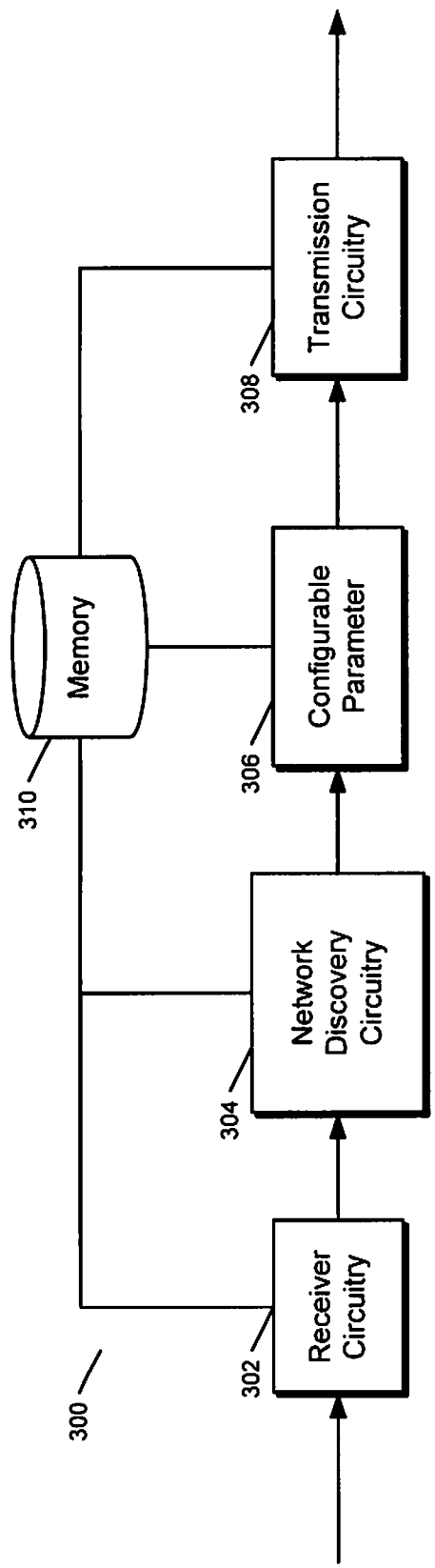
FIG. 3 illustrates a wireless device in accordance with one implementation.

FIG. 3 illustrates one implementation of a wireless device 300. The wireless device 300 can correspond to one or both of the first wireless device 102 and the second wireless device 104 of FIG. 1. As shown in FIG. 3, the wireless device 300 includes receiver circuitry 302, a network discovery service 304, a configurable parameter 306, transmission circuitry 308, and a memory 310. The wireless device 300 can further include one or more processors (not shown), which (in one implementation) executed instructions associated with the network discovery service 304. In one implementation, the receiver circuitry 300 is configured to listen to receive discovery-related traffic (e.g., beacons, probe responses, probe requests, public action frames, and the like). The network discovery service 304 adjusts the configurable parameter 306 (e.g., as discussed in the examples above) based on the discovery-related traffic received by the receiver circuitry 302. The transmission circuitry 308 is configured to transmit discovery-related traffic (e.g., beacons, probe responses, probe requests, public action frames, and the like) in accordance with the configurable parameter 306, as adjusted by the network discovery service 304.

One or more of method steps described above can be performed by one or more programmable processors executing a computer program to perform functions by operating on input data and generating output. Generally, various implementations can take the form of an entirely hardware embodiment, an entirely software embodiment or an embodiment containing both hardware and software elements. In one implementation, various aspects are implemented in software, which includes but is not limited to firmware, resident software, microcode, etc. Furthermore, various implementations can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device. The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

Various implementations for performing discovery of wireless devices have been described. Nevertheless, various modifications may be made to the implementations. For example, though the techniques described above refer to wireless communication standards, the techniques may be applicable to wired communication standards. In addition, steps of the methods described above can be performed in a different order and still achieve desirable results. Accordingly, many modifications may be made without departing from the scope of the following claims.

What is claimed is:

1. A method, comprising:
   initiating, at a first wireless device, a discovery protocol having a configurable parameter, the discovery protocol being associated with discovery of one or more second wireless devices;
   determining how many second wireless devices are within a predetermined range of the first wireless device;
   adjusting the configurable parameter of the discovery protocol based on how many of the second wireless devices were determined to be within the predetermined range of the first wireless device; and
   at the first wireless device, completing the discovery of one or more second wireless devices in accordance with the configurable parameter of the discovery protocol as adjusted based on how many of the second wireless devices were determined to be within the predetermined range of the first wireless device,
   wherein the configurable parameter of the discovery protocol that is adjusted based on how many of the second wireless devices were determined to be within the predetermined range of the first wireless device corresponds to one or more of
      a power at which the first wireless device transmits discovery-related packets, an interval at which a beacon is transmitted by the first wireless device,
      a backoff time at which a beacon is to be transmitted by the first wireless device,
      whether or not the first wireless device is to send a probe request,
      whether or not the first wireless device is to send a probe response, or
      whether or not the first wireless device is to send a beacon at all.

2. The method of claim 1, wherein determining how many of the second wireless devices within the predetermined range of the first wireless device comprises listening for discovery-related traffic over a wireless communication channel.

3. The method of claim 1, wherein determining how many of the second wireless devices within the predetermined range of the first wireless device comprises:
   determining how many of only those second wireless devices that communicate in accordance with one or more specific wireless communication standards, and excluding second wireless devices that do not communicate in accordance with the one or more specific wireless communication standards.

4. The method of claim 1, wherein the discovery protocol is specified by a wireless communication standard.

5. The method of claim 4, wherein the wireless communication standard corresponds to one or more of the IEEE 802.11 standard, Bluetooth, infrared, GPRS, WiMAX, EDGE, 3G, or HSDPA.

6. A first wireless device, comprising:
   a network discovery service configured to
      initiate a discovery protocol having a configurable parameter, the discovery protocol being associated with discovery of one or more second wireless devices;
      determine how many second wireless devices are within a predetermined range of the first wireless device;
      adjust the configurable parameter of the discovery protocol based on how many of the second wireless devices were determined to be within the predetermined range of the first wireless device; and
      complete the discovery of one or more second wireless devices in accordance with the configurable parameter of the discovery protocol as adjusted based on how many of the second wireless devices were determined to be within the predetermined range of the first wireless device,
   wherein the configurable parameter of the discovery protocol that is adjusted based on how many of the second wireless devices were determined to be within the predetermined range of the first wireless device corresponds to one or more of
      a power at which the first wireless device transmits discovery-related packets, an interval at which a beacon is transmitted by the first wireless device,
      a backoff time at which a beacon is to be transmitted by the first wireless device,
      whether or not the first wireless device is to send a probe request,
      whether or not the first wireless device is to send a probe response, or
      whether or not the first wireless device is to send a beacon at all.

7. The first wireless device of claim 6, wherein the network discovery service is configured to determine how many of the second wireless devices are within the predetermined range of the first wireless device by listening for discovery-related traffic over a wireless communication channel.

8. The first wireless device of claim 6, wherein the network discovery service is configured to determine how many of the second wireless devices are within the predetermined range of the first wireless device by:

determining how many of only those second wireless devices that communicate in accordance with one or more specific wireless communication standards, and excluding second wireless devices that do not communicate in accordance with the one or more specific wireless communication standards.

9. The first wireless device of claim 6, wherein the discovery protocol is specified by a wireless communication standard.

10. The first wireless device of claim 9, wherein the wireless communication standard corresponds to one or more of the IEEE 802.11 standard, Bluetooth, infrared, GPRS, WiMAX, EDGE, 3G, or HSDPA.

\* \* \* \* \*